Patented Sept. 7, 1954

2,688,565

UNITED STATES PATENT OFFICE 2,688,565

REFRACTORY BASE CONTAINING A LOW REFLECTION COATING AND METHOD OF MAKING SAME

Richard F. Raymond, Saxonburg, Pa., assignor to Pittsburgh Plate Glass Company, a corporation of Pennsylvania No Drawing. Application July 1, 1949, Serial No. 102,701

14 Claims. (Cl. 117—35)

This invention relates to articles of manufacture which are provided with a light reflecting coating, and to methods of producing oxides, preferably in the form of reflecting films. According to this invention, novel articles, which comprise a glass or like base having a light reflecting film of cobalt oxide thereon, are provided. Such coating may exhibit high or low light reflection, depending upon the nature of the coating and the method of deposition.

According to one embodiment of the invention, a novel, low reflection black mirror has been provided. Such mirror comprises a plate glass or like base provided with a low reflection mirror cobalt oxide coating. This coating may be provided by contacting glass or like material, while hot, with cobalt nitrate, $Co(NO_3)_2$, as hereinafter described. Such mirrors have a visible light reflection factor below 20 percent, usually being about 10–15 percent. Such mirrors are especially valuable as rear view mirrors in automotive vehicles.

According to a further embodiment, glass or like material may be provided with a high reflecting film having visible light reflection factors around 25–50 percent and above, and light transmissions of about 30–40 percent. Such films may be provided by contacting a hot glass or like base with cobalt acetate, $Co(CH_3COO)_2$, as hereinafter described.

In the performance of the process, a glass or similar base is heated to an elevated temperature, usually above about 400° F., and preferably above 800° F., but below the temperature at which the base tends to become molten, and the hot base is contacted with the cobalt compound, particularly cobalt acetate or nitrate, before cooling of the base below 400° F. occurs. This contact is usually effected by spraying the hot base with an aqueous or organic solution of the cobalt compound. Such contact is normally effected by conducting the spraying or other treatment in atmospheric air, and therefore in the presence of oxygen, together with more or less atmospheric moisture. The maximum permissible temperature of the base will, of course, vary according to the nature of the base. For example, when lime soda glass is to be coated, a temperature of 800 to 1250° F. is suitable. When borosilicate glass is to be coated, higher temperatures, up to about 1300 to 1400° F. are permissible.

The products which are obtained by the process herein described, are found to comprise the glass, or like base, having a coating of a thin film which usually is transparent. This film is largely, if not entirely, composed of cobalt oxide, the composition being a mixture of $CoO$ and $Co_2O_3$; the sum of the concentrations of cobalt and oxygen therein usually being above about 99 percent. Nickel may be incorporated in the film, as will be discussed hereinafter, and in such a case, the sum of the nickel, cobalt and oxygen concentrations in the film will total 99 percent or more of the film.

As previously noted, the process may be conducted by spraying or otherwise contacting the heated glass, or like base, with an aqueous solution of the cobalt salt. Thus, a saturated solution of cobaltic acetate, perchlorate or nitrate or equivalent, in water, may be sprayed over the heated glass. Alternatively, organic solutions or vapors of either of these salts may be used, if desired. While such solutions may contain other components, the predominant film-forming component should be the cobalt salt. Generally, presence of other metals (except nickel) adversely affects the character of the film. Hence, the cobalt salt or its solution should not contain more than 5 percent (preferably less than 1 percent) by weight of other metals which tend to deposit with the cobalt, based upon the weight of cobalt. The amount of the solution so used normally is quite small since the use of an excess of such a solution would tend to shock-chill the surface of the glass, and might tend to cool the glass sheet so rapidly as to cause fracture thereof, or even to prevent substantial formation of the film. Usually, spraying the heated sheet for a few seconds, for example 1 to 20 seconds, with a fine spray, will be suitable for the purpose.

The films thus produced are quite thin, usually being substantially 25 to 800 millimicrons in thickness. Such films possess some transparency to visible light, depending upon the compound used in their preparation. Thicker opaque films may be deposited, if desired, by repeating the coating process, i. e. by heating, spraying, reheating, respraying, etc. Such films, if too thick, may have poor adhesion.

As previously indicated, the physical character of the film produced is influenced by the nature of the cobalt compound used. Thus, when an aqueous solution of cobalt nitrate is sprayed upon the hot glass, a black mirror coating of a black cobalt oxide is produced. This film, as ordinarily produced, has a thickness below 800 millimicrons and, in very thin films (below 200–300 millimicrons), is transparent to visual light. However, thicker deposits normally are opaque. An outstanding characteristic of this mirror coating is its low light reflection factor, as previously mentioned. Glass coated on one surface with a black mirror cobalt oxide film is especially suited for use as a low reflection rear surface mirror, such as for a rear vision mirror in automotive vehicles. One especially advantageous characteristic of these mirrors is that backing, lacquers, or coatings conventionally used with rear vision mirrors comprising glass provided with lead sulphide mirror coatings, are not normally necessary. The electrical resistance of this black cobalt oxide film is about 20,000 ohms per unit square.

When cobalt acetate is used, the resulting film is brown in color, has a reflection factor of 30 to 50 percent, and light transmission of about 35 percent. Moreover, this coating is only slightly conductive, a transparent film having a surface resistance of about 100,000 ohms per unit square or above. This product may be used wherever high reflection films are of advantage as, for example, in one-way vision mirrors. They are also quite valuable for use as front surface rear vision mirrors. In such a case, the high reflection film is applied upon one side and the uncoated or opposed side is provided with a conventional opaque backing.

The following examples are illustrative:

Polished plate glass sheets of lime soda glass, 4 inches by 8 inches by 7/64 inch (4″ x 8″ x 7/64″) were heated for two minutes at a furnace temperature of 1150° F., and each plate immediately thereafter was suspended in atmospheric air of normal humidity (containing about 0.003 to 0.02 pound of water per pound of air). One to three cubic centimeters of an aqueous solution of a cobalt salt was immediately sprayed upon one side of the heated glass plate, at a pressure of about 40 pounds per square inch, from a conventional atomizing gun, and the plate was allowed to cool.

The following table tabulates the results obtained:

Other lime soda glasses which have the typical composition:

SiO₂ _____ 71.38 percent by weight
(usual variation 71 to 73% by weight)
Na₂O _____ 12.79 percent by weight
(usual variation 12 to 14% by weight)
CaO _____ 9.67 percent by weight
(usual variation 8 to 11% by weight)
MgO _____ 4.33 percent by weight
(usual variation 3 to 6% by weight)

may be used. Furthermore, the invention may be extended to the provision of coatings upon other glass or refractory, and preferably transparent, products such as borosilicate glass, china, phosphate glass, lead X-ray glass, glass fiber, quartz, silicon carbide, aluminum oxide, mica, stone, tungsten carbide, and other refractory articles.

The films which are produced by cobalt acetate have been observed to be subject to attack by acids and acid gases which are present in the atmosphere. Hence, such films may weather badly. According to this invention, films of improved durability and resistance to acids may be produced by incorporating a quantity of nickel in the film. This may be effected by incorporating nickel, usually as nickel acetate, in the solution to be sprayed on the glass or like base.

In a typical example, 10 cubic centimeters of a solution, prepared by dissolving 50 grams of cobalt acetate, Co(CH₃COO)₂.4H₂O, in 50 milliliters of water, is added to a solution of one gram of nickel acetate, Ni(CH₃COO)₂.4H₂O, in 5 milliliters of water. When this combined solution is applied to glass or like base, as described above, the film is more durable and resistant to corrosion, but otherwise has the reflection properties of the film obtained by cobalt acetate alone. Nickel also may be added to the cobalt nitrate or perchlorate solutions, according to this invention, in order to improve the films produced thereby.

The amount of nickel used in the solution is capable of some variation but, in general, will be less than the cobalt in the solution, usually being below about 50 percent of the cobalt in solution.

| Solutions | Composition | Properties of Products |
| --- | --- | --- |
| 1. Co(C₂H₃O₂)₂.4H₂O<br>Water | 50 grams<br>do | Transparent, durable adherent, amber brown film having light reflection above 30% and light transmission of about 35%. |
| 2. Co(NO₃)₂.6H₂O<br>Water | do<br>do | Black mirror film which, when exposed to 4% aqueous NaCl solution, did not develop haze until over 695 hours. |
| 3. CoBr₂ | Saturated aqueous solution | Transparent brown to black film. |
| 4. Cobalt Perchlorate | do | Black mirror film. |

The above tests were made using plate glass which has the composition:

Per cent by weight
SiO₂ _____ 71.52
Na₂O _____ 13.02
CaO _____ 11.62
MgO _____ 2.52
Na₂SO₄ _____ 0.76
NaCl _____ 0.12
Fe₂O₃ _____ 0.11
Al₂O₃ _____ 0.33

Appreciable amounts, usually above 1 to 5 percent of nickel, based upon the cobalt in the solution, generally are required.

The film thus obtained is a complex nickel-cobalt oxide, over 99 percent of which is composed of cobalt, nickel and oxygen.

As shown in the above examples, an aqueous solution of the salt was used. Such solutions should be true solutions, as distinguished from colloidal suspensions, to ensure clarity of the films produced. Organic solvents, such as ethanol, methanol, or like alcohol, may be used in lieu of water. Moreover, the cobalt salts may be dispersed in solid water soluble waxes, such as polyethylene oxide.

The concentration of the cobalt salt, in the aqueous or like solvents, depends upon the solubility thereof. Excessively dilute solutions are objectionable since they tend to shock-chill the glass or other refractory base. Saturated solutions are generally suitable. Preferably, the solution should contain at least 5 percent by weight of the cobalt salt. Other components may be present where they do not adversely affect production of the above described films.

Although the present invention has been described with reference to the specific details of certain embodiments thereof, it is not intended that such details shall be regarded as limitations upon the scope of the invention except insofar as included in the accompanying claims.

What is claimed is:

1. A method of providing a transparent refractory base with a continuous black coating comprising a cobalt oxide and having a light reflection factor of about 10 to 15 percent, which comprises heating the base to a temperature above about 400° F., but below the temperature at which the base melts, and contacting a hot surface thereof with a solvent containing dissolved therein cobalt nitrate, the sum of the weights of the solvent and cobalt nitrate constituting at least 95 per cent by weight of said solution whereby to decompose said cobalt nitrate and deposit a cobalt oxide coating on said base, the sum of cobalt and oxygen combined as an oxide being at least 99 per cent of said coating.

2. An article of manufacture produced in accordance with the process of claim 1.

3. A method of providing a transparent refractory base with a continuous transparent brown coating comprising a cobalt oxide and having a light reflection factor of about 25 to 50 per cent and a light transmission of about 30 to 40 per cent, which comprises heating the base to a temperature above about 400° F., but below the temperature at which the base melts, and contacting a hot surface thereof with a solvent containing dissolved therein cobalt acetate, the sum of the weights of the solvent and cobalt acetate constituting at least 95 per cent by weight of said solution whereby to decompose said cobalt acetate and deposit a cobalt oxide coating on said base, the sum of cobalt and oxygen combined as an oxide being at least 99 per cent of said coating.

4. An article of manufacture produced in accordance with the process of claim 3.

5. A method of providing a refractory base with a continuous transparent coating, which comprises heating the base to a temperature above about 400° F., but below the temperature at which the base melts, and contacting a hot surface thereof with a solvent containing dissolved therein cobalt acetate and nickel acetate, the sum of the weights of the solvent, cobalt acetate and nickel acetate constituting at least 95 per cent by weight of said solution and the nickel content of said solution being between 1 to 50 per cent based upon the cobalt in said solution, whereby to decompose said cobalt acetate and said nickel acetate and deposit a film on said base, the combined nickel, cobalt and oxygen concentration in said film being at least 99 per cent of the film.

6. An article of manufacture produced in accordance with the process of claim 5.

7. A method of providing a refractory base with a continuous low reflection coating, which comprises heating the base at a temperature above about 400° F., but below the temperature at which the base melts, and contacting a hot surface thereof with a solvent containing dissolved therein nickel acetate and a cobalt compound selected from the group consisting of cobalt acetate, cobalt nitrate, and cobalt perchlorate, the sum of the weights of the solvent, nickel acetate and the cobalt compound selected from said group constituting at least 95 per cent by weight of said solution and the nickel content of said solution being between 1 to 50 per cent based upon the cobalt in said solution, whereby to decompose said cobalt compound and said nickel salt and deposit a film on said base, the combined nickel, cobalt and oxygen concentration in said film being at least 99 per cent of the film.

8. An article of manufacture produced in accordance with the process of claim 7.

9. A method of providing a refractory base with a continuous low reflection coating, which comprises heating the base at a temperature above about 400° F., but below the temperature at which the base melts, and contacting a hot surface thereof with a solvent containing dissolved therein a cobalt compound of the group consisting of cobalt acetate, cobalt nitrate, and cobalt perchlorate, the sum of the weight of the solvent and the cobalt compound selected from said group constituting at least 95% by weight of said solution, whereby to decompose said cobalt compound and deposit a cobalt oxide coating on said base, the sum of cobalt and oxygen combined as an oxide being at least 99% of said coating.

10. An article of manufacture produced in accordance with the process of claim 9.

11. A method of providing a refractory base with a transparent coating, which comprises heating the base at a temperature above about 400° F., but below the temperature at which the base melts, and contacting a hot surface thereof with a solution containing dissolved therein nickel acetate and a cobalt salt selected from the group consisting of cobalt acetate, cobalt nitrate and cobalt perchlorate, the nickel content of said solution being between 1 to 50 per cent based upon the cobalt in the solution, whereby to decompose said cobalt salt and said nickel salt and deposit a film on said base, the combined nickel, cobalt and oxygen concentration in said film being at least 99 per cent of the film.

12. An article of manufacture produced in accordance with the process of claim 11.

13. A method of providing a refractory base with a transparent coating, which comprises heating the base at a temperature above about 400° F., but below the temperature at which the base melts, and contacting a hot surface thereof with a solution containing dissolved therein a cobalt salt selected from the group consisting of cobalt acetate, cobalt nitrate and cobalt perchlorate, whereby to decompose said cobalt salt and deposit a cobalt oxide coating on said base the combined cobalt and oxygen in said coating being at least 99 per cent thereof.

14. An article of manufacture produced in accordance with the process of claim 13.

(References on following page)

References Cited in the file of this patent

UNITED STATES PATENTS

| Number | Name | Date |
|---|---|---|
| 894,845 | Mitchell | Aug. 4, 1908 |
| 1,662,564 | Colbert et al. | Mar. 13, 1928 |
| 2,118,795 | Littleton | May 24, 1938 |
| 2,165,773 | Wheeler et al. | July 11, 1939 |
| 2,194,189 | Wheeler et al. | Mar. 9, 1940 |
| 2,390,424 | Colbert | Dec. 4, 1945 |
| 2,475,379 | Stong | July 5, 1949 |
| 2,578,956 | Weinrich | Dec. 18, 1951 |

OTHER REFERENCES

Mellor, Comprehensive Treatise on Inorganic and Theoretical Chemistry, volume 14, Longmans Green and Co., New York, N. Y., 1935.